United States Patent Office 3,374,868
Patented Mar. 26, 1968

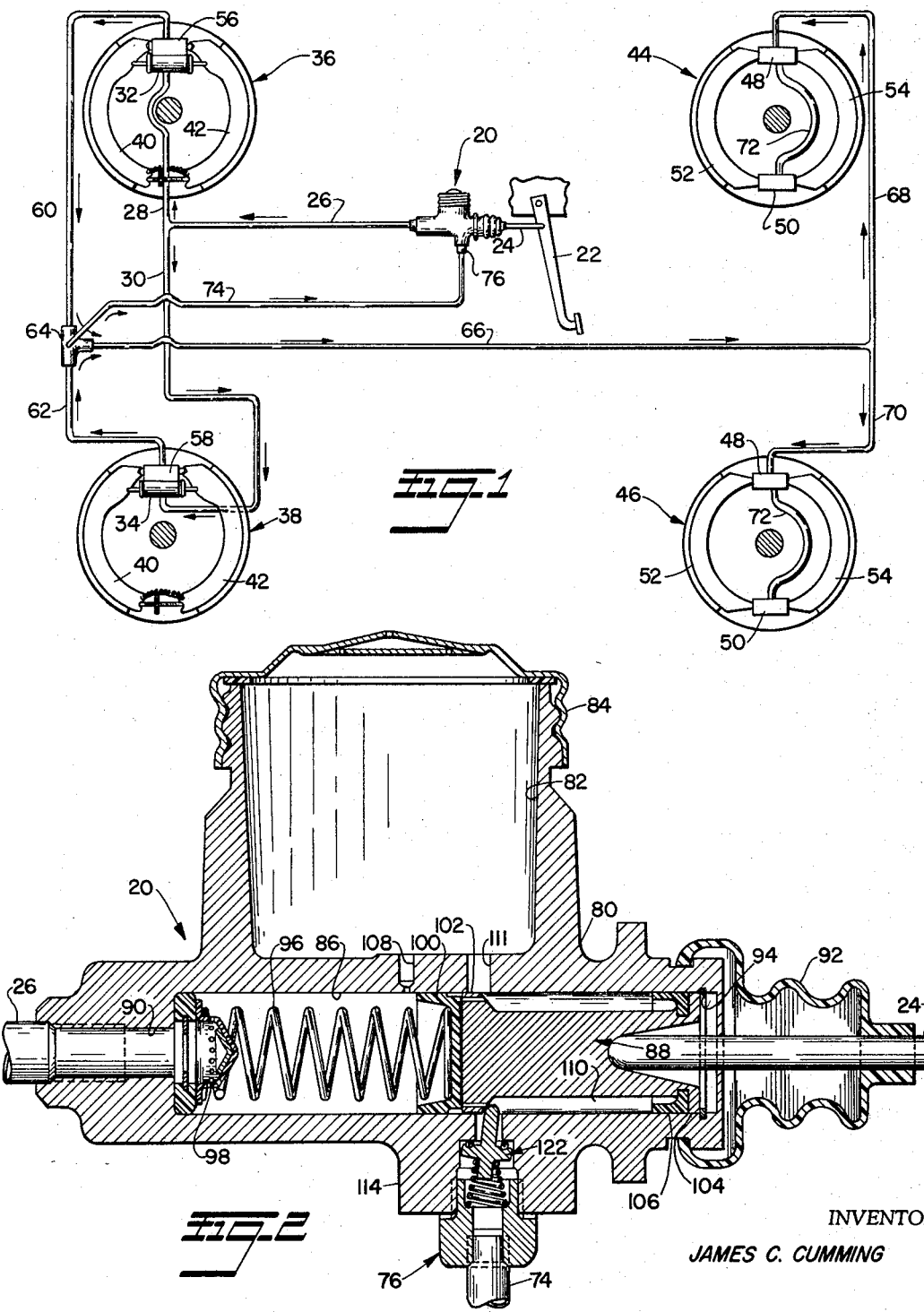

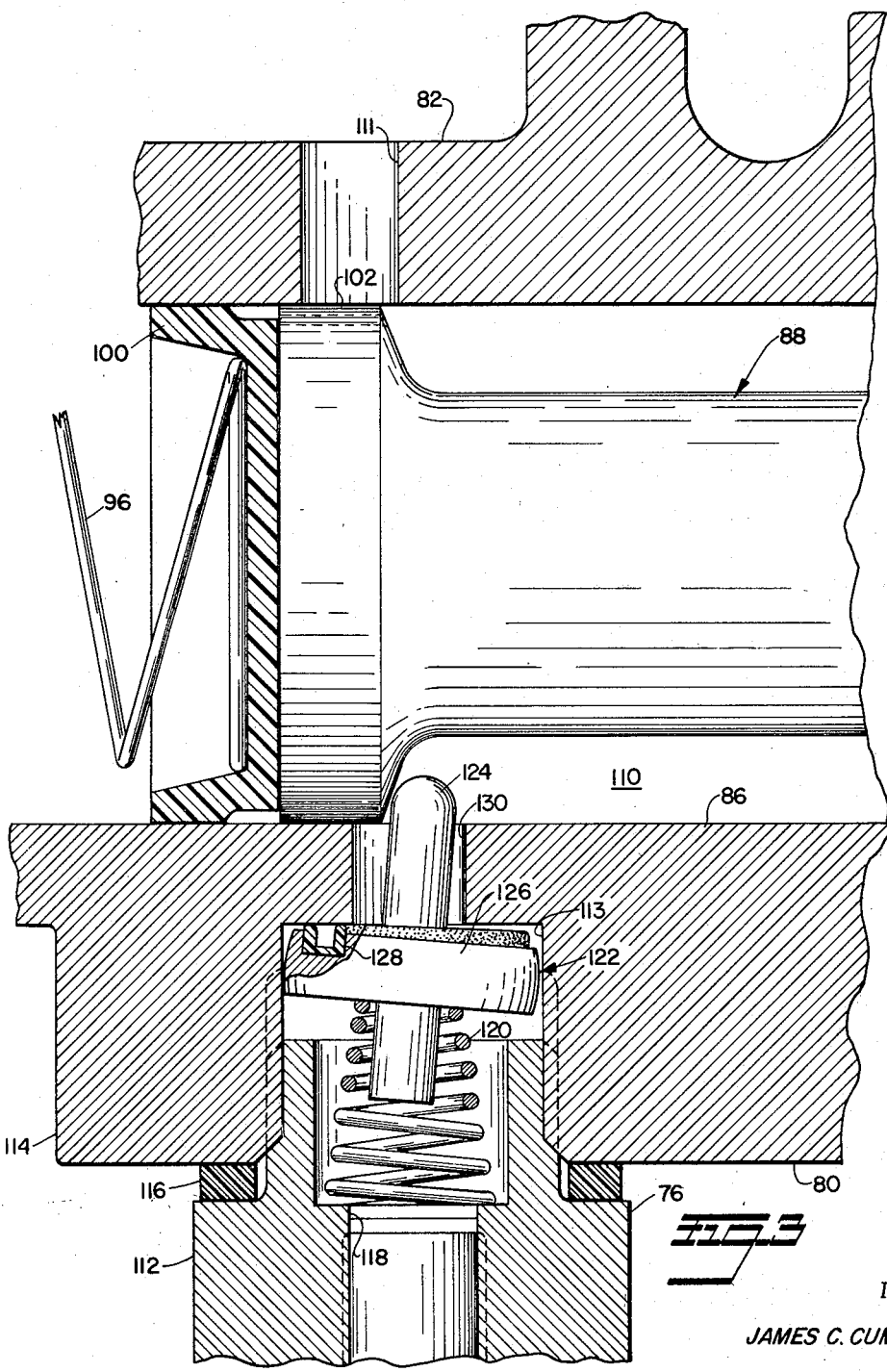

3,374,868
BRAKE SYSTEM
James C. Cumming, Pleasant Ridge, Mich., assignor to Rockwell-Standard Corporation, Pittsburgh, Pa., a corporation of Delaware
Continuation of application Ser. No. 491,774, Sept. 30, 1965. This application Sept. 20, 1966, Ser. No. 580,828
2 Claims. (Cl. 188—152)

ABSTRACT OF THE DISCLOSURE

Master cylinder for a torque reaction brake system with independent primary and secondary circuits, the master cylinder having a piston, a portion of which pressurizes only the primary circuit and another portion of which controls a valve for isolating the primary and secondary circuits except when the brakes are released.

Related applications

This application is a continuation of application Ser. No. 491,774 filed Sept, 30, 1965, for Brake System, and now abandoned, which in turn was a continuation-in-part of application Ser. No. 292,559 filed July 3, 1963, for Brake Systems, and also now abandoned.

This invention relates to brake systems and more particularly to improved master cylinders especially adapted for use with brake systems in which the torque reaction force developed at one or more of the vehicle wheel brakes is utilized to actuate the brakes at the remaining wheels.

In general, such systems comprise one or more primary brakes of special construction which are connected in a primary circuit to be actuated by a master cylinder operated by the usual brake pedal. The primary brakes also include power cylinders which are actuated by the torque reaction developed upon application of the primary brakes to pressurize a secondary circuit to actuate the remaining brakes which are conventional anchored brakes.

To assure effective operation of such brake systems it is essential that the primary and secondary circuits be completely independent during brake application. It is also essential that provision be made for supplying make-up fluid to each of the circuits and to permit the release of excess fluid on heating and expression of the brake fluid in the systems. The replenishment of fluid as well as the bleed back of excess fluid are essential to assure that the columns of fluid in both the primary and secondary circuits will be solid and full at all times. Finally, for reasons of economy and to satisfy weight and space requirements it is desirable that the primary and secondary brake circuits be selectively connected to the same reservoir, preferably the reservoir usually provided in the master cylinder.

It is a principal purpose and object of the present invention to provide novel master cylinders for use in brake systems of the type described above which satisfy the foregoing requirements to a degree not heretofore attained.

It is a further object of the present invention to provide improved master cylinders including unique valve constructions which are inexpensive to manufacture, which are reliable in operation, and which have an extended service life.

It is also an object of the present invention to provide master cylinders for use in brake systems of the type having independent primary and secondary brake circuits, the master cylinders including a unique valve assembly effective immediately upon brake application to isolate the primary and secondary circuits from each other and from a common reservoir.

In attaining these and other objects the present invention provides a master cylinder having the usual reservoir and a pedal operated piston connected to a primary circuit, an independent connection to the secondary circuit, and a valve assembly for selectively connecting the secondary circuit to the reservoir or positively isolating the secondary circuit from the reservoir. The valve is opened against spring force by movement of the piston to brake release position. It is closed by spring force immediately upon movement of the piston in a brake applying direction and is held closed throughout brake application by the spring force augmented by the pressure developed in the secondary circuit during brake application.

Additional objects and advantages of the present invention will become apparent as the description proceeds in connection with the accompanying drawings in which:

FIGURE 1 is a schematic representation of a vehicle brake system incorporating the novel master cylinder of the present invention;

FIGURE 2 is a central vertical section of the master cylinder in the position it occupies when the brakes are fully released; and FIGURE 3 is an enlarged fragmentary section of the valve assembly incorporated in the master cylinder of FIGURE 2.

Referring now more particularly to the drawings the brake system shown in FIGURE 1, except for the master cylinder described in detail below, is the same as that shown in co-pending application Ser. No. 450,596 filed Apr. 26, 1965, now Patent No. 3,256,962, for Brake Systems to which reference may be had for further details of construction and operation. The master cylinder assembly, indicated generally at 20, is operated in the usual manner by a brake pedal 22 acting through a pushrod 24. A conduit 26 leading from the master cylinder divides into branch conduits 28 and 30 leading to service cylinders 32 and 34 respectively of the vehicle front wheel brake assemblies 36 and 38.

The brake assemblies 36 and 38 are associated with the wheels of the vehicle carrying the lightest load. In a standard passenger car the brakes 36 and 38 will be installed at the rear wheels whereas in a truck they will be installed at the front wheels. The service cylinders 32 and 34 are operative in an essentially conventional manner to displace the associated brake shoes 40 and 42 outwardly against a relatively rotating drum on the wheel (not shown) when the brake pedal 22 is depressed. Thus the brake assemblies 36 and 38 are actuated in an essentially conventional manner. The circuit comprising the conduits 26, 28 and 30 and the service cylinders 32 and 34 may be called the primary hydraulic circuit.

The secondary brake assemblies 44 and 46 are of wholly conventional construction and each comprises a pair of service cylinders 48 and 50 acting on the opposite ends of the brake shoes 52 and 54 to displace these shoes outwardly into engagement with the surrounding rotatable drum, not shown.

The brake assemblies 36 and 38 also include power cylinders 56 and 58, respectively, in which pressure is developed as a result of a torque reaction developed when the brake assemblies 36 and 38 are applied. As explained in greater detail in the aforementioned co-pending application Ser. No. 450,596, when the brake shoes 40 and 42 engage the surrounding drum and the service cylinders 32 and 34 are pressurized, the brake shoes shift circumferentially slightly in the direction of drum rotation. It is this action which develops pressure in the power cylinders 56 and 58.

The power cylinders 56 and 58 are connected by respective conduits 60 and 62 to a T-fitting 64 in turn connected to the service cylinders 48 of the respective brake assemblies 44 and 46. Additional conduits 72 are provided to connect the cylinders 48 and 50 in each of the brake assemblies to insure simultaneous action of each of the wheel cylinders 48 and 50. The T-fitting 64 is also connected by a branch line 74 to the master cylinder 28 through a unique valve assembly 76 described in detail below. The hydraulic circuit containing the power cylinders 56 and 58 and the conduits leading to the brake assemblies 44 and 46 may be termed the secondary hydraulic circuit.

Considering the operation of the system thus far described, depression of the foot pedal 22 pressurizes the primary hydraulic circuit to actuate the wheel cylinders 32 and 34 to apply these brakes and cause a circumferential shift of the associated brake shoes which pressurizes the power cylinders 56 and 58 to pressurize the secondary hydraulic circuit and thereby apply the secondary brakes 44 and 46. When the brake pedal 22 is released all of the brakes are returned to their original position. Actual experience has shown that the action of the system is such that the secondary brakes 44 and 46 are applied and released substantially simultaneously with the application and release of the primary brakes 36 and 38.

To assure proper and effective functioning of this system it is necessary to provide a constant predetermined volume of fluid in the secondary circuit. Additionally, means must be provided to allow additional fluid to enter the secondary circuit when the shoes of the secondary brakes are adjusted outwardly due to lining wear thereby increasing the volume in the wheel cylinders 48 and 50. Also, the secondary circuit must be cut off from the reservoir and from the primary circuit immediately upon brake application. For these purposes the novel master cylinder and valve which forms a primary aspect of the invention are provided and will now be described in detail.

The master cylinder 20 comprises a one piece body 80, the upper portion of which forms a reservoir chamber 82 having a removable cap 84 to permit refilling of the reservoir as needed. Immediately below the reservoir 82 the housing is provided with a bore 86 in which a piston 88 connected to rod 24 is slidably received. At one end the bore 86 is connected to a reduced bore 90, the outer end of which is threaded for the reception of the end of the conduit 26 leading to the primary circuit. The other end of the bore 86 is closed by a protective flexible boot 92 attached to the housing 80 and to the pushrod 24. The piston 88 is normally held in its retracted position against a snap ring 94 by a return spring 96 compressed between a residual check valve 98 at the end of bore 86 and a flexible cup 100 carried by the inner end of the piston. The central body portion of the piston 88 is reduced between cylindrical portions 102 and 104 at the front and rear ends of the piston, the latter carrying a sealing cup 106.

The reservoir 82 is connected to the portion of the bore 86 between the forward end of the piston 88 and the conduit 26 by a port 108. The chamber 110 formed around the reduced central portion of the piston is connected to the reservoir by a port 111.

The valve assembly 76, which selectively connects the conduit 74 of the secondary hydraulic circuit to the reservoir chamber 82, includes a body member 112 having a reduced section threaded into a bore 113 in a boss 114 formed integrally with the body of the master cylinder. A seal ring 116 is clamped between the parts. The valve body 112 is provided with a through opening 118, the outer end of which is threaded for the reception of the end of the conduit 74, and the inner end in which is enlarged to provide a chamber for the reception of a spring 120 which normally biases the valve element indicated generally at 122 to closed position.

The valve member 122 comprises a stem 124 and a circular flange 126 integral therewith. The flange 126 has a flat bottom surface engaged by the spring 120, the lower projecting portion of the stem 124 providing a spring guide. The upper surface of the flange 126 is grooved for the reception of a rubber seal ring 128 which is preferably bonded in place. The outer surface of the flange is formed as a portion of a sphere with its maximum radial dimension being slightly less than the radius of the bore 113 in which the valve is received to facilitate tilting of the valve assembly from an upright position to the inclined position shown while preventing unwanted lateral movement and binding. The upper projecting portion of the stem 124 is received with a substantial clearance in a passage 130 connecting bores 113 and 86.

When the brakes are released, the parts occupy the position shown in FIGURES 2 and 3. In this position the enlarged end portion 102 of the piston 88 engages the rounded upper end of the valve stem 124 and tilts the entire valve assembly away from its normal vertical position. Valve assembly is tilted rather than displaced laterally or vertically because of the spherical surface of the flange 126 and the action of the spring 120. In this position free communication is established between the reservoir 82 and the conduit 74 of the secondary circuit through the port 111, the space around the reduced central portion of the piston 88, port 130, around the flange 126 of the valve element and through the passage 118 in the valve body. Accordingly, the fluid may freely pass to or from the secondary circuit as required. Immediately upon advancement of the piston 88 in a brake applying direction, the piston is moved out of contact with the valve stem which is immediately closed by the action of the spring 120 placing the seal member 128 in peripheral contact with the wall connecting the bores 130 and 113. This action completely isolates the secondary circuit from the primary circuit and from the reservoir 82. In the further advancement of the piston 88, the port 108 connecting the primary circuit with the reservoir 82 is closed and continued movement of piston 88 pressurizes the primary hydraulic circuit to actuate the brakes 36 and 38.

As described above, this action actuates the power cylinders 56 and 58 to pressurize the secondary circuit to apply the brakes 44 and 46. The increase in pressure in the secondary circuit is transmitted through the conduit 74 to the bottom surface of the valve body 122 to augment the force of spring 120 and hold the valve 122 positively closed throughout brake application. The valve remains closed until the piston 88 is substantially fully retracted and the pressure in the primary and secondary circuit has been fully released. Since the valve 122 is opened by tilting rather than by bodily vertical displacement the retraction of the stem 88 under the influence of the spring 96 will be effective to open it even though some residual pressure may remain in the secondary circuit.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A master cylinder for use in a brake system for a vehicle having a plurality of wheel sets, said brake system having independent primary and secondary hydraulic circuits, said primary circuit being connected to actuate the brakes of one wheel set and said secondary circuit being connected to actuate the brakes of other wheel sets and the pressure in said secondary circuit being developed solely in response to the torque reaction developed upon actuation of the brakes of said one wheel set, said master cylinder comprising means forming a reservoir and a power cylinder in said master cylinder, a piston in said power cylinder movable between brake applying and brake releasing positions, said piston forming with said cylinder a pressure chamber having first and second ports connected respectively to said primary circuit and said reservoir, there being a second chamber in said power cylinder having third and fourth ports connected, respectively, to said reservoir and to said secondary hydraulic circuit, said third port being constantly open to prevent the development of pressure in said second chamber, a check valve for selectively opening and closing said fourth port, said check valve having a surface engageable by a first portion of said piston only when said piston is in said brake releasing position to open said check valve, means resiliently urging said check valve toward the closed position, and said piston having a second portion rigid with said first portion and unitarily movable therewith adapted to close second port immediately upon movement of said piston away from said brake releasing position whereby immediately upon movement of said piston away from brake releasing position said primary circuit is isolated from said reservoir and said secondary circuit is isolated from master cylinder, said primary circuit, and said resevoir, said check valve having an additional surface exposed to the pressure in said secondary hydraulic circuit to be held closed thereby during brake application.

2. The master cylinder according to claim 1 wherein said check valve comprises a valve member having a stem projecting through said fourth port into the path of said first portion of said piston, a flange carried by said stem, said flange being received in a cylindrical chamber forming an enlarged extension of said fourth port, said flange having a spherical surface in close clearance relation with the wall of said cylindrical chamber to permit said valve member to tilt between the open and closed positions without substantial movement of said valve member laterally or longitudinally of said stem.

References Cited

UNITED STATES PATENTS

| 2,115,230 | 4/1938 | Oliver | 188—152 |
| 3,033,324 | 5/1962 | Lepelletier | 188—152 |
| 3,044,581 | 7/1962 | Lepelletier | 188—152 |

FOREIGN PATENTS 62,951  2/1955  France.

MILTON BUCHLER, *Primary Examiner.*

G. E. HALVOSA, *Assistant Examiner.*